(12) United States Patent
Benavides et al.

(10) Patent No.: US 12,242,637 B2
(45) Date of Patent: Mar. 4, 2025

(54) AUGMENTED INTELLIGENT MACHINE FOR SYSTEMATIC ATTRIBUTION OF DATA SECURITY

(71) Applicant: American Express Travel Related Services Company, Inc., New York, NY (US)

(72) Inventors: Sowmya Benavides, Granger, IN (US); Debasish Das, New York, NY (US); Venkata Srikanth Dasari, Bayonne, NJ (US); Kavita Gupta, Princeton, NJ (US); Nikitha Kasam, Harrison, NJ (US); Gita Kolla, Scottsdale, AZ (US); Ashok Nair, Phoenix, AZ (US); Bimal Ramankutty, Phoenix, AZ (US); Sulabh Shukla, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 222 days.

(21) Appl. No.: 18/104,153

(22) Filed: Jan. 31, 2023

(65) Prior Publication Data

US 2024/0256698 A1   Aug. 1, 2024

(51) Int. Cl.
*G06F 21/62* (2013.01)
*G06F 21/31* (2013.01)

(52) U.S. Cl.
CPC .......... *G06F 21/6227* (2013.01); *G06F 21/31* (2013.01)

(58) Field of Classification Search
CPC .............................. G06F 21/6227; G06F 21/30

USPC ........................................................... 726/26
See application file for complete search history.

(56) References Cited

U.S. PATENT DOCUMENTS

| | | | |
|---|---|---|---|
| 11,157,652 B2 * | 10/2021 | Basava | H04L 9/0643 |
| 2007/0208714 A1 * | 9/2007 | Ture | G06F 21/6227 |
| 2012/0131351 A1 * | 5/2012 | Balinsky | H04L 9/0825 |
| | | | 713/189 |
| 2012/0290849 A1 * | 11/2012 | Simske | H04L 9/3247 |
| | | | 713/189 |
| 2016/0098572 A1 * | 4/2016 | Povalyayev | H04L 63/102 |
| | | | 726/28 |
| 2017/0116190 A1 * | 4/2017 | Bastide | G06F 40/56 |
| 2017/0319477 A1 * | 11/2017 | Burnett | A61F 5/003 |
| 2023/0262066 A1 * | 8/2023 | Arumugam Maharaja | H04L 63/0428 |
| | | | 726/4 |

* cited by examiner

*Primary Examiner* — Teshome Hailu
(74) *Attorney, Agent, or Firm* — Thomas Horstemeyer, LLP (57) ABSTRACT

Disclosed are various embodiments for augmented intelligent machine for systematic attribution of data security. A set of global regulations is received by the system. Next, at least one decision rule for mapping one or more data elements is output based at least in part on the set of dynamic global regulations. A data input is received from at least one data source. Next, the data input is parsed to determine at least one sensitive data elements. Then, a confidentiality level of at least one sensitive data element is determined. The ingesting table is joined with a drive mapping data set. Finally, at least one security policy is applied to a type of data input based at least in part on the drive mapping data set or the confidentiality level.

14 Claims, 7 Drawing Sheets

AUGMENTED INTELLIGENT MACHINE FOR SYSTEMATIC ATTRIBUTION OF DATA SECURITY

BACKGROUND

Financial institutions collect data about their users, businesses, financial transactions, etc. The data is often collected globally and throughout different countries. Many countries require strict adherence to their data privacy laws governing the collection, storage, and usage of the collected data. Many times, the data collected from different sources is stored, regardless of where the data originated. Often times, data is only available to be viewed or requested by a user based at least in part on an users access level.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for implementing an augmented intelligent machine for systematic attribution of data security (AIMSDS). The AIMSDS can implement data security, confidentiality, and regulatory schemes. Although the term "regulation" is used throughout the disclosure, it should be understood that regulation covers data security, confidentiality, and regulation. Generally, data is collected from users, businesses, and financial transactions from countries all over the world. The data can be subject to the laws and regulations of the origin country and the country where it is used and/or stored. When the data is collected, it is often stored based at least in part on the data elements, such as the first/last name, address, phone number, etc. In some instances, the data or the metadata of the data collected can be tagged. The data tags can help to identify the origin of data from the data input.

In contrast to other approaches, which are manual processes for defining the tagging and classification of data elements, hardcoded rules, or managing new rule implementing or enhancing the existing rules through the development lifecycle, the approaches herein the AIMSDS are based at least in part on machine learning to allow for learning in both supervised and unsupervised fashion to proactively create schemas for real time and run time access provisioning; modular and flexible for dynamically adapting to global regulations and constraints; modular and flexible for dynamically adapting to user access controls; managing variety of data types for proper data classification and tagging. In some examples, the decision rule engine can receive dynamic global regulations and output a decision rule. The decision rule engine can receive the dynamic global regulations from one or more sources. In other examples, the classification and tagging service can classify and tag the data from a data input. The classification and tagging service can also tag metadata of the data input using a plurality of classification techniques. In other examples, the propagating service can parse the data from the data input. Further, the propagating service can automatically analyze, process, and distribute data across a variety of systems. In some other examples, the output service can be executed to display records requested by the user. Further, the output service can display a notification to the user.

For example, when data is collected in the State of California in the United States, the AIMSDS application can adapt to the rules and regulations of the California Consumer Privacy Act (CCPA). In another example, when data is collected in Japan, the AIMSDS application can adapt to the rules and regulations of the Action on the Protection of Personal Information (APPI). Based at least in part on the CCPA or APPI, the data can be tagged and classified while honoring individual privacy preferences and honoring the geographical location of the data. The data can be tagged and be assigned to the data elements. The data elements could be determined to be sensitive data and classified as confidential. The user can request to view the data after meeting the varying degrees of user access control, wherein the user access control can be achieved by entering user credentials or detection of a physical security key. Upon authorization, the requested records can be viewed and/or displayed.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
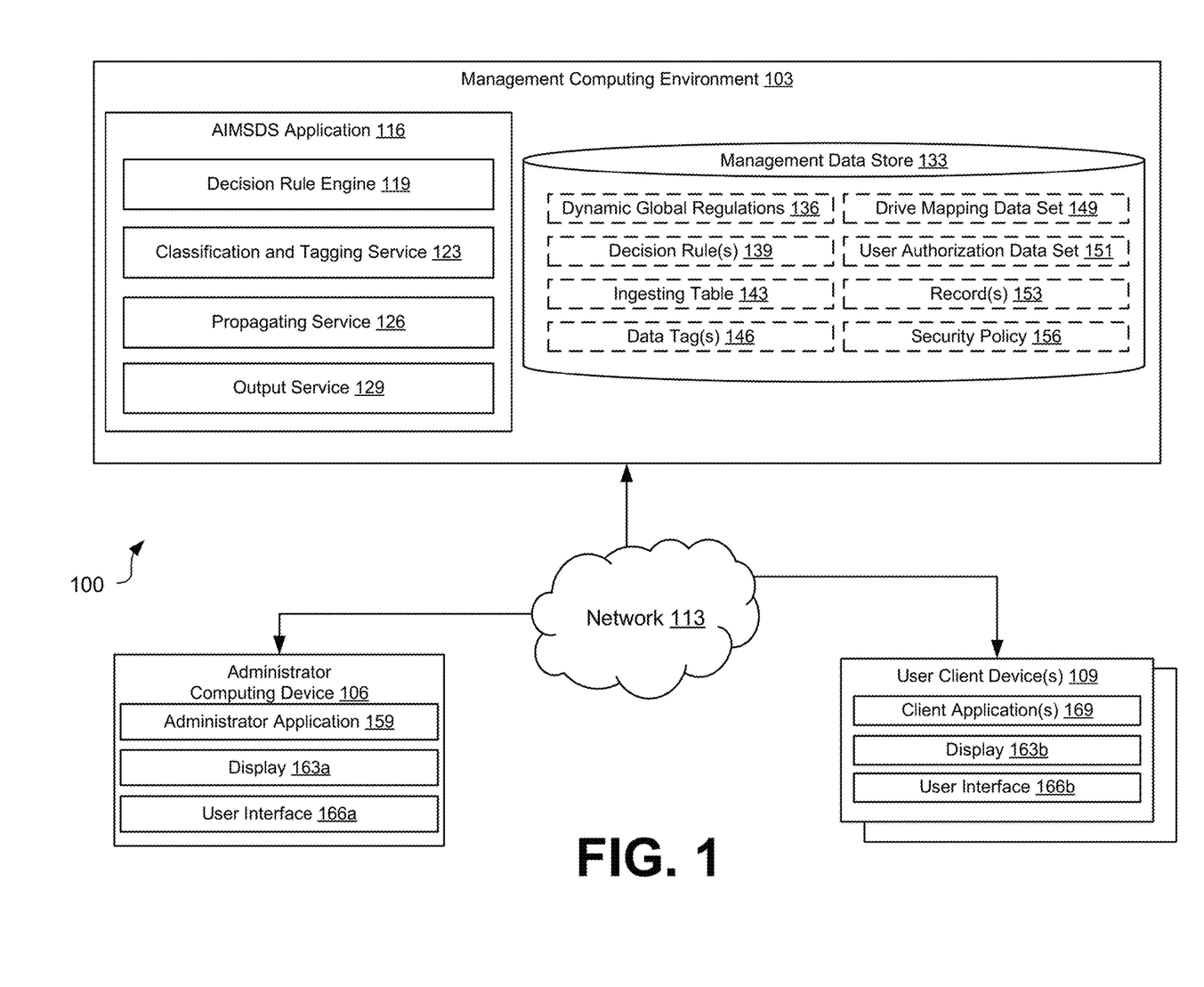
FIG. 1 is a drawing of a network environment according to various embodiments of the present disclosure.

With reference to FIG. 1, shown is a network environment 100 according to various embodiments. The network environment 100 can include a management computing environment 103, an administrator computing device 106, and a user client device 109, which can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include an augmented intelligent machine for systematic attribution of data security (AIMSDS) application 116, and other applications, services, processes, systems, engines, or functionality not discussed in detail herein. Moreover, the AIMSDS application 116 can contain component applications such as a decision rule engine 119, a classification and tagging service 123, a propagating service 126, and an output service 129 which would be executed by the computing environment 103.

Also, various data is stored in a management data store 133 that is accessible to the computing environment 103. The management data store 133 can be representative of a plurality of management data stores 133, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the management data store 133 is associated with the operation of the various applications or functional entities described below. This data can include one or more dynamic global regulations 136, one or more decision rules 139, a one or more ingesting tables 143, one or more data tags 146, a drive mapping data set 149, a user authorization data set 151, one or more records 153, at least one security policy, and potentially other data.

A dynamic global regulation 136 can represent laws and/or policies that govern data collection, storage, and usage. In some examples, the dynamic global regulations 136 and provide a framework for the collection, storage, and usage of data. In other examples, the dynamic global regulations 136 can be used to determine the at least one decision rule 139 for mapping one or more data elements. For example, the General Data Protection Regulation (GDPR), Act on the Protection of Personal Information (APPI), and the California Consumer Privacy Act (CCPA) can be used to determine the dynamic global regulations 136. In some instances, the user can provide and define the dynamic global regulations 136 via the administrator computing device 106 or the user client device 109.

A decision rule 139 can represent how the organization or entity can collect, store, or use data. In some examples, the one or more decision rules 139 can be used to determine the drive mapping data set. In other examples, the decision rules 139 can be used for considerations of data ethics and principles of valid data usage. In other examples, the decision rules 139 can be used to output a data tag for the one or more data elements. In some examples, the decision rules 139 can be used to determine the confidentiality level of sensitive data. In other examples, the decision rules 139 can be used to determine which data elements should be encrypted or given a certain user access level requirement. In other examples, the decision rules 139 can be provided and/or defined by the user via the administrator computing device 106 or the user client device 109.

An ingesting table 143 can represent a data table used for inputting data from one or more data sources. In some examples, the ingesting table 143 can represent data from a plurality of data sources in a central location. In other examples, the data in the ingesting table 143 can be used to store data prior to being parsed or tagged. In other examples, the ingesting table 143 can be joined with the drive mapping data set 149 to validate data. In other examples, the ingesting table 143 can be joined with the drive mapping data set 149 to clean or parse data loaded from a plurality of data sources.

A data tag 146 can represent the identity of the stored data. In some examples, the data tags 146 can be impacted by the decision rules 139 in the naming scheme. In other examples, the data tags 146 can be assigned or imported by the user via the administrator computing device 106 or the user client device 109. In other examples, the data tag can include multiple rows and columns of the ingesting table 143. In other examples, the data tag may represent the entirety of the data stored in the ingesting table 143. In some other examples, the data tag can be updated based at least in part on the data imported and stored. In other examples, the data tag can be the keyword or term assigned to some data in the ingesting table 143.

A drive mapping data set 149 can represent the storage area to a computing device on the network 113. In other examples, the drive mapping data set 149 can be based at least in part on the dynamic global regulations 136. In other examples, the drive mapping data set 149 can be joined with the ingesting table 143. In other examples, the drive mapping data set 149 can instruct the computing device(s) on the network 113 to store data in one or more locations. In some examples, the drive mapping data set 149 can instruct the computing device(s) on the network 113 to store data in one or more geographic location. The data can be stored on the computing device or over the cloud. In other examples, the drive mapping data set 149 can be changed or updated by the user via the administrator computing device 106 or the user client device 109.

A user authorization data set 151 can represent a set of information that controls access to data. In some examples, the user authorization data set 151 can include information such as permissions, access rights, and roles. In some examples, the user authorization data 151 can be joined with the drive mapping data set 149. In some instances, the user authorization data set 151 can determine the user access level of a user. In other examples, the user authorization data set 151 can change the user access level of a user. In other examples, the user authorization data set 151 can be changed or updated by the administrator computing device 106. In some other examples, the user authorization data set 151 can be changed or updated by the client device 109.

A record 153 can represent a set of data in the ingesting table 143. In some examples, the records can be retrieved by the AIMSDS application upon a request from the user. The records 153 may be tagged by the classification and tagging service 123 as sensitive and require a specific user access level. In other examples, the records 153 may require a data key or a composite key to be accessed. The records 153 may be requested or viewed by the user via the administrator computing device 106 or the user client device 109. In some examples, the records 153 can contain metadata. In other examples, the records can be uploaded or changed by the user via the administrator computing device 106 and the user client device 109.

A security policy 156 can represent the policies and guidelines that are applied to the ingesting table. In other examples, the security policy 156 can be applied to the data input before being stored in the ingesting table. In other examples, the security policy 156 can be based at least in part on the dynamic global regulations 136. The security policy 156 can be updated or changed by the user via the administrator computing device 106 or the user client device 109. In other examples, the security policy 156 can request or enforce encryption of the data. In some other examples, the security policy 156 can require specific user access levels for a user to access the data of the ingesting table 143. In some other examples, the security policy 156 can request or enforce processes such as data anonymization, data purging, data deletion, and data archive. In some examples, the security policy 156 can enforce or request the AIMSDS application 116 to send the records 153 to a computing device to be displayed. In some other examples, the security policy 156 can enforce or request the records 153 from displaying on the display on a computing device.

The decision rule engine 119 of the AIMSDS application 116 can be executed to receive the dynamic global regulations 136. The decision rule engine 119 can use the dynamic global regulations 136 to output at least one decision rule for mapping one or more data elements. In other examples, the decision rule engine 119 can receive the dynamic global regulations from one or more source. For example, the decision rule engine 119 can receive a user defined set of regulations and use the GDPR, APPI, or CCPA. In other examples, the decision rule engine 119 can contain a configurator. The configurator of the decision rule engine 119 can be used to determine the parameters and rules. The user can modify the configurator via the administrator computing device 106. In some examples, the decision rule engine 119 can contain a scheduler. The scheduler of the decision rule engine 119 can be used to configure when the decision rule engine 119 can run. The scheduler can be configured by the user via the administrator computing device 106. The scheduler and the configurator can be configured to allow the decision rule engine 119 to run without user input.

The classification and tagging service 123 of the AIMSDS application 116 can be executed to classify and tag data from the one or more data source. In classification and tagging service 123 can be used to identify and classify sensitive data. In other examples, the classification and tagging service 123 can be used to assign tags to determine the data elements. In other examples, the classification and tagging service 123 can be used to assign metadata to the data input. The classification and tagging service 123 can use a machine learning technique, a natural language processing technique, or rule based technique to classify and tag data. The classification and tagging service 123 can use one or more techniques to classify and tag data. The classification and tagging service can determine keywords and/or patterns, such as a phone number, social security number, street address, etc. In other examples, the classification and tagging service 123 can be used to identify patterns to assign the sensitive data element the confidentiality level. The classification and tagging service 123 can be used to remove tags from the data. In some examples, the classification and tagging service 123 can identify one or more data class such as business transactions, clickstream, etc.

The propagating service 126 of the AIMSDS application 116 can be executed to automatically analyze, process, and distribute data across a variety of systems. In some examples, the propagator service 126 can be used to read and write data between applications. In some examples, the propagating service 126 can contain a parsing service to parse data. In other examples, the propagating service 126 can be used for access provisioning and rule execution. In other examples, the propagating service 126 can be used to manage relationships between tables, such as the ingesting table 143 and the tables in other various applications. In other examples, the propagating service 126 can be used to maintain a stable data set across a variety of systems and various applications. In some examples, the access provisioning component of the propagator service 126 can be based at least in part on predefined set of user rules. The predefined set of user rules can include a list of user identities, a variety of access levels and/or roles, and predefined access criteria. In other examples, the propagator service 126 can be executed to apply the one or more security policies 156.

The output service 129 of the AIMSDS application 116 can be executed to display the requested record 153. In some examples, the output service can display at least one of a denial notification or an approved notification on the display 163*a* of the administrator computing device 106 or the display 163*b* of the user client device 109. In some other examples, the output service 129 can allow the user to view and/or download the requested records 153.

The administrator computing device 106 is representative of a plurality of client devices that can be coupled to the network 113. The administrator computing device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The administrator computing device 106 can include one or more displays 163*a*, such as liquid crystal displays (LCDs), gas plasma-based flat panel displays, organic light emitting diode (OLED) displays, electrophoretic ink ("E-ink") displays, projectors, or other types of display devices. In some instances, the display 163a can be a component of the administrator computing device 106 or can be connected to the administrator computing device 106 through a wired or wireless connection.

The administrator computing device 106 can be configured to execute various applications such as the administrator application 159 or other applications. The administrator application 159 can be executed in the administrator computing device 106 to access network content served up by the management computing environment 103 or other servers, thereby rendering a user interface 166a on the display 163a. To this end, the administrator application 159 can include a browser, a dedicated application, or other executable, and the user interface 166a can include a network page, an application screen, or other user mechanism for obtaining user input. The administrator computing device 106 can be configured to execute applications beyond the administrator application 159 such as email applications, social networking applications, word processors, spreadsheets, or other applications.

An administrator application 159 can be executed to allow the user to change the data stored in the data store 133. In some examples, the administrator application 159 can display a user interface 166a on the display 163a of the administrator computing device 106. In other examples, the administrator application 159 can be executed to allow the user to modify at least one of the dynamic global regulations 136, decision rules 139, records 153, and security policy 156.

A user client device 109 is representative of a plurality of client devices that can be coupled to the network 113. The user client device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The user client device 109 can include one or more displays 163b, such as liquid crystal displays (LCDs), gas plasma-based flat panel displays, organic light emitting diode (OLED) displays, electrophoretic ink ("E-ink") displays, projectors, or other types of display devices. In some instances, the display 163b can be a component of the user client device 109 or can be connected to the user client device 109 through a wired or wireless connection.

A user client device 109 can be configured to execute various applications such as a client application 169 or other applications. The client application 169 can be executed in the user client device 109 to access network content served up by the management computing environment 103 or other servers, thereby rendering a user interface 166b on the display 163b. To this end, the client application 169 can include a browser, a dedicated application, or other executable, and the user interface 166b can include a network page, an application screen, or other user mechanism for obtaining user input. The user client device 109 can be configured to execute applications beyond the client application 169 such as email applications, social networking applications, word processors, spreadsheets, or other applications.

The client application 169 can be used by the user to interact with the financial institution or other services that use the AIMSDS application 116. In some examples, the user interface 166b of the user client device 109 can present an application to request records 153 from one or more data elements on the display 163b of the user client device 109. In other examples, the user can interact with the user interface 166b on the display 163b of the user client device 109 to change settings of the client application 169. For example, the user can use the client application 176 to input or modify the security policy 156.

Next, a general description of the operation of the various components of the network environment 100 is provided. Although the following description provides a general description of the interactions between the various components of the network environment 100, other interactions are also encompassed by the various embodiments of the present disclosure.

To begin, a financial institution or other entity can store collections of data that pertain to users, clients, businesses, financial transactions, etc. The aforementioned information could be collected from users, transactions, or databases. Data usage, storage, and collection policies vary throughout the world based on each geographical locations' regulatory body and governing data privacy laws. The users/clients, transactions, and businesses could be based in countries with a data privacy regime requiring the business and/or institution collecting the data to follow the countries' data privacy laws, such as the GDPR for European countries, APPI for Japan, or the CCPA for the State of California in the United States.

To continue with the collection, storage, and usage of data, the management of the data needs to adhere to the laws of the governing body. For example, one or more sets of dynamic global regulations 136 could apply to the record 153. The decision rule engine 119 can receive the applicable regulations to output the one or more decision rules 139. The decision rule engine 119 can output the one or more decision rules 139 based at least in part on the one or more set of dynamic global regulations 136. The decision rules 139 could be used to determine the drive mapping data set, determine geographic origin of the data input, and provide a framework to determine if the data element is a sensitive data element.

Next, the data can be received from at least one data source. The data source can be a database, a text file, a spreadsheet, etc. The data input from the data source is stored in the one or more ingesting tables 143. The classification and tagging service 123 could tag the data of the data input. In some examples, the classification and tagging service 123 can tag the metadata of the data of the data input. The data input can be parsed to further determine patterns or type of data. For example, the parsed data can be used to determine if the number in a data field is a phone number or a social security number based at least in part on the pattern or formatting. Additionally, the classification and tagging service 123 can determine the confidentiality of the sensitive data elements. In some examples, the classification of confidentiality of the data elements can be based at least in part on predefined rules. In other examples, the classification of confidentiality of the data elements can be defined by the user via the administrator computing device 106 or the user client device 109.

Next, the propagating service 126 can distribute the data of the ingesting table 143 to one or more computing devices on the network 113. The propagating service 126 could define access provision for user access to requested records of the ingesting table 143. In other examples, the propagating service 126 could execute the security policy 156 or predefined rules. The security policy 156 could be modified by the user via the administrator computing device 106 or the user client device 109.

Finally, based on the availability of data and user credential authentication, the output service 129 can display the requested records. In some examples, the output service 129 can display a notification based at least in part on the security entitlements of the user. In some other examples, the output service 129 can display a denial message if the AISMR application 116 determines the user does not have access to the requested records 153. In other examples, the output service 129 could show an approval message allowing the user to at least one of view and/or download the requested records 153.

Figure 2A:
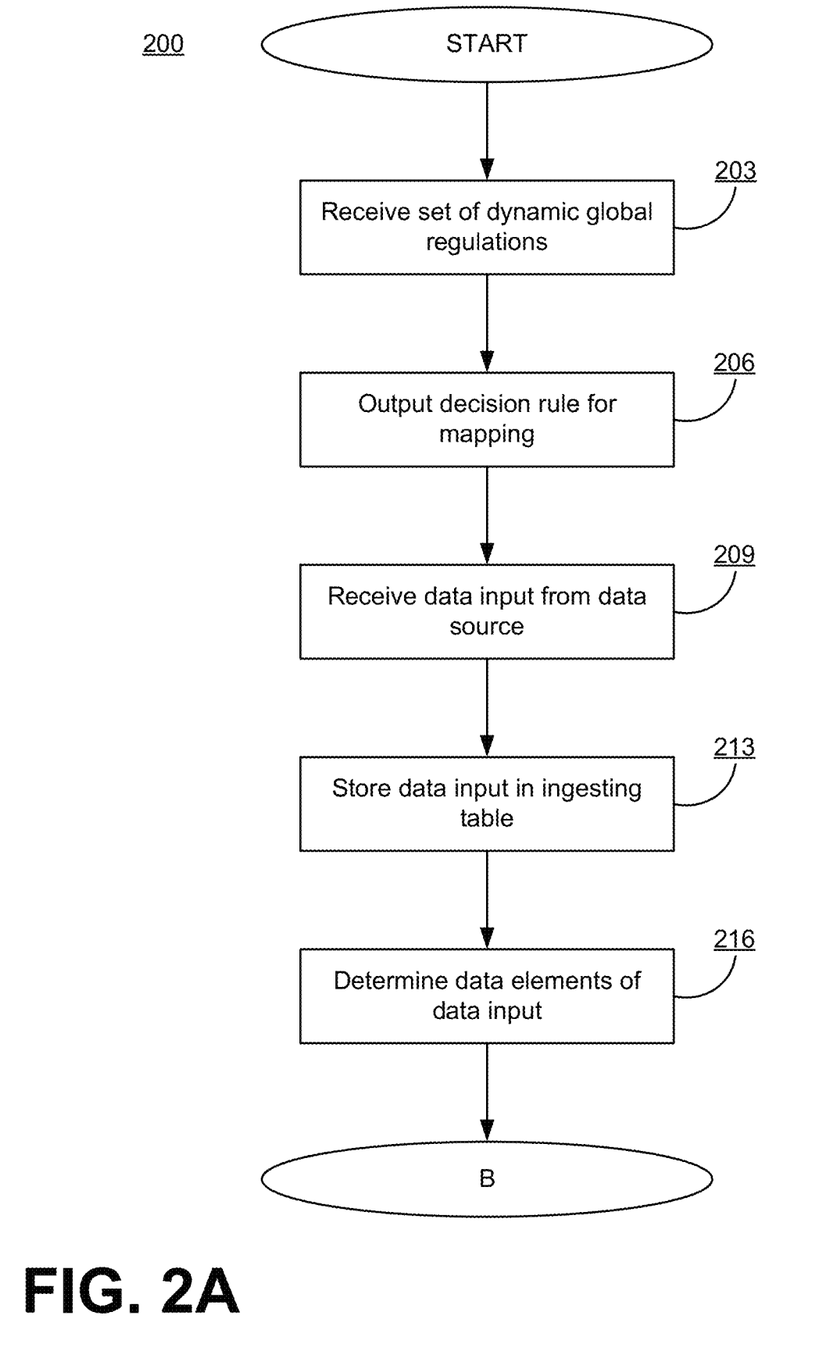
FIG. 2A is a flowchart illustrating one example of functionality implemented as portions of an application executed in a computing environment in the network environment of FIG. 1 according to various embodiments of the present disclosure.
Figure 2B:
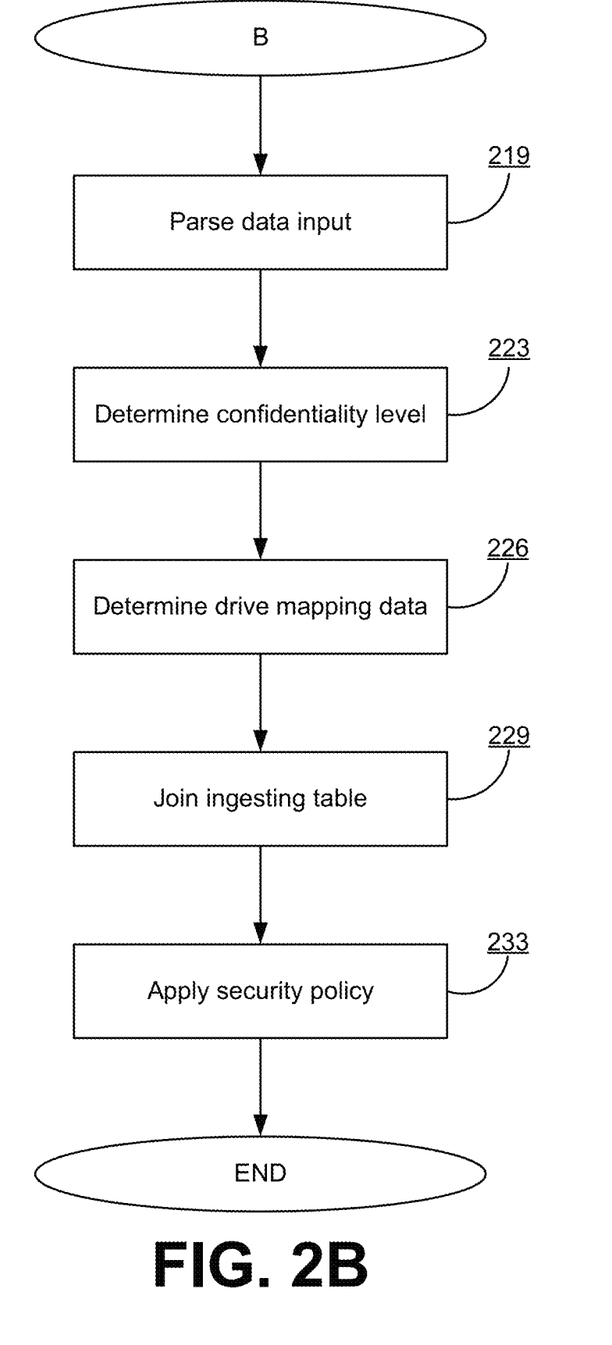
FIG. 2B is a flowchart illustrating one example of functionality implemented as portions of an application executed in a computing environment in the network environment of FIG. 1 according to various embodiments of the present disclosure

Referring next to FIGS. 2A and 2B, shown is a flowchart that provides one example of the operation of a portion of the AIMSDS application 116. The flowchart of FIGS. 2A and 2B provides merely an example of the many different types of functional arrangements that can be employed to implement the operation of the depicted portion of the AIMSDS application 116. As an alternative, the flowchart of FIGS. 2A and 2B can be viewed as depicting an example of elements of a method implemented within the network environment 103.

Beginning with block 203, the AIMSDS application 116 can receive a set of dynamic global regulations 136. The dynamic global regulations 136 can be used to determine at least one decision rule 139 for mapping one or more data elements. In other examples, the dynamic global regulations 136 can be based on existing data collection, storage, and usage regulations. For example, the dynamic global regulations 136 can be based at least in part on the GDPR, APPI, and/or the CCPA. In other examples, the AIMSDS application 116 can receive the dynamic global regulations 136 from the user via the administrator computing device 106 and/or the user client device 109.

At block 206, the AIMSDS application 116 can output at least one decision rule 139 for mapping one or more data elements. In some examples, the decision rules 139 can be based at least in part on the dynamic global regulation 136. In other examples, the decision rules 139 can be based at least in part on the regulations set by the user. In other examples, the decision rules 139 can be preset by the user via the administrator computing device 106 and/or the user client device 109.

At block 209, the AIMSDS application 116 can receive a data input from the at least one data source. The AIMSDS application 116 can receive the data input in real time. In some examples, the AIMSDS application 116 can receive the data input simultaneously from a plurality of data sources.

At block 213, the AIMSDS application 116 can store the data input from the at least one data source in at least one ingesting table 143. In some examples, the data input can be stored in a plurality of ingesting tables 143. In other examples, the plurality of data inputs can be stored in an individual ingesting table 143.

At block 216, the AIMSDS application 116 can determine the one or more data elements of the data input. The data elements can represent one or more of personally identifiable information, financial transactions, or businesses/business units. The data elements of the data input can be used for analyzing data, joining tables, pattern identification, and/or training a machine learning model. In some examples, the data elements of the data input can be sensitive data elements.

At block 219, the AIMSDS application 116 can parse the data input to determine a data element type. In some examples, the data element type can be the sensitive data elements. In other examples, the sensitive data elements can be determined based at least in part on one or more predefined rules or a user input received via the administrator computing device 106 or the user client device 109. For example, personally identifiable information such as name, address, phone number, social security number, etc. can be sensitive data elements. In some examples, the machine learning model can be used to determine the data is personally identifiable information and be determined to be the sensitive data element.

At block 223, the AIMSDS application 116 can determine a confidentiality level of at least one sensitive data element of the data input in the at least one ingesting table 143. In some examples, the confidentiality level can be predefined by a set of rules. In other examples, the confidentiality level can be input by the user via the administrator computing device 106 or the user client device 109. For example, the AIMSDS application 116 can determine the confidentiality level for a user's name is lesser than that of the user's social security number. The confidentiality level can be used to determine access to the sensitive data elements. In some examples, the confidentiality level can be determined based at least in part on the dynamic global regulations 136. In other examples, the confidentiality level can be determined based at least in part on one of the data input or the data source.

At block 226, the AIMSDS application 116 can determine the drive mapping data set. In some examples, the drive mapping data set 149 can be based at least in part on the at least one decision rule 139. In other examples, the drive mapping data set 149 can be based at least in part on the confidentiality level of the sensitive data element. In some other examples, the drive mapping data set 149 can be based at least in part on the security policy 156.

At block 229, the AIMSDS application 116 can join the at least one ingesting table 143 with the drive mapping data set 149. In some examples, joining the ingesting table 143 with the drive mapping data set 149 can be used to determine the storage location for the data input from the one or more data sources. In other examples, the ingesting table 143 can be joined with the drive mapping data set 149 for at least one of data validation, data transformation, data parsing/cleaning, or data enrichment. In some examples, joining the ingesting table 143 with the drive mapping data set 149 can determine user access list or control the data that is accessible by one or more users.

At block 233, the AIMSDS application 116 can apply the security policy 156 to the data input. In some examples, the security policy 156 can be based at least in part on the drive mapping data set 149. In other examples, the security policy 156 can be based at least in part on the confidentiality level of the sensitive data elements. The security policy 156 can be input by the user via the administrator computing device 106 and/or the user client device 109. In some examples, the security policy 156 can determine which data requires encryption. In other examples, the security policy 156 can enforce encryption of the data in the ingesting table 143. In some examples, the security policy can restrict access to the one or more records 153 of the ingesting table 143. In some other examples, the security policy 156 can request or enforce processes such as data anonymization, data purging, data deletion, and data archive. In some examples, the security policy 156 can enforce or request the AIMSDS application 116 to send the records to a computing device to be displayed. In some other examples, the security policy 156 can enforce or request the records 153 from displaying on the display on a computing device.

Figure 3A:
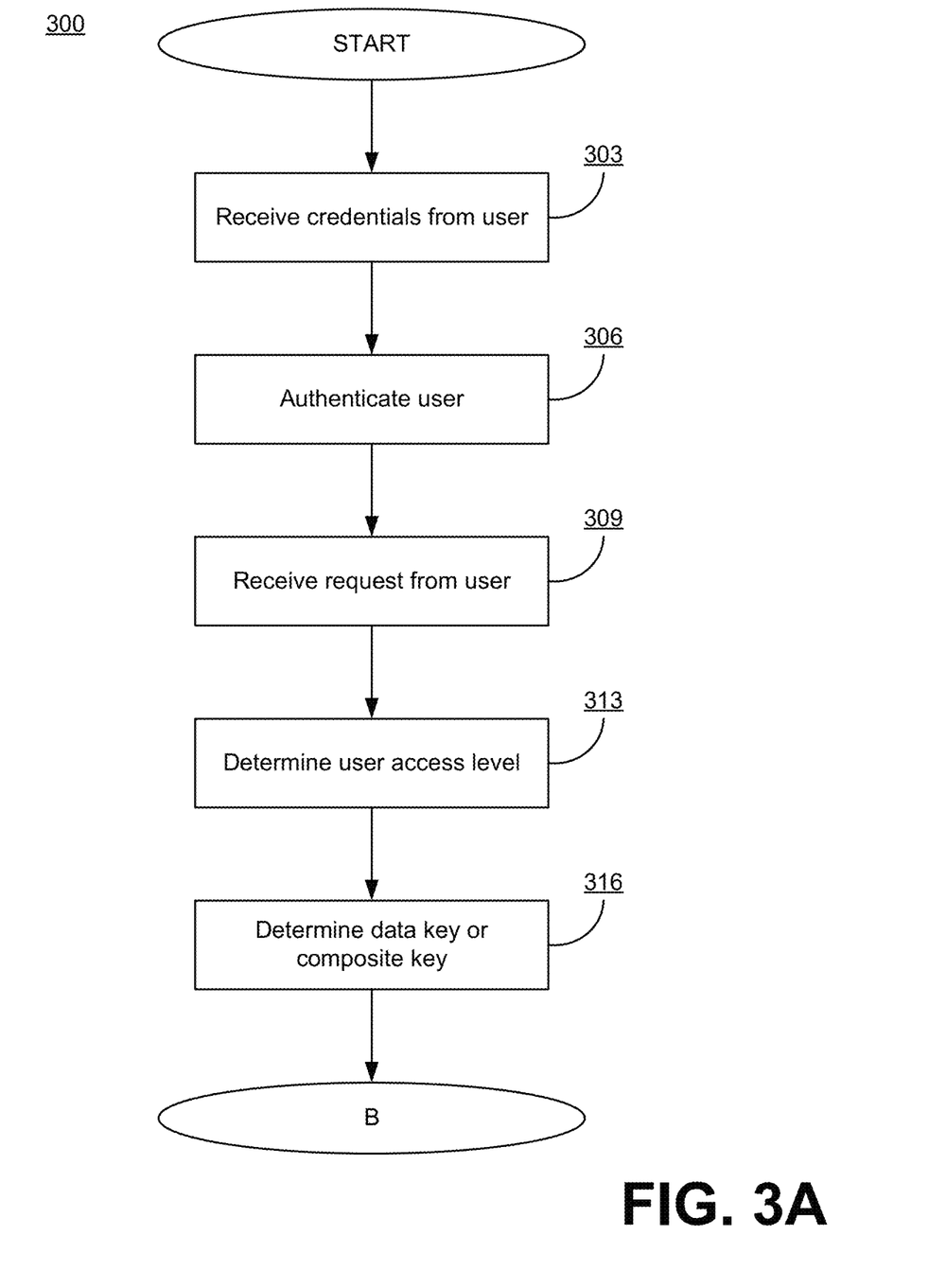
FIG. 3A is a flowchart illustrating one example of functionality implemented as portions of an application executed in a computing environment in the network environment of FIG. 1 according to various embodiments of the present disclosure.
Figure 3B:
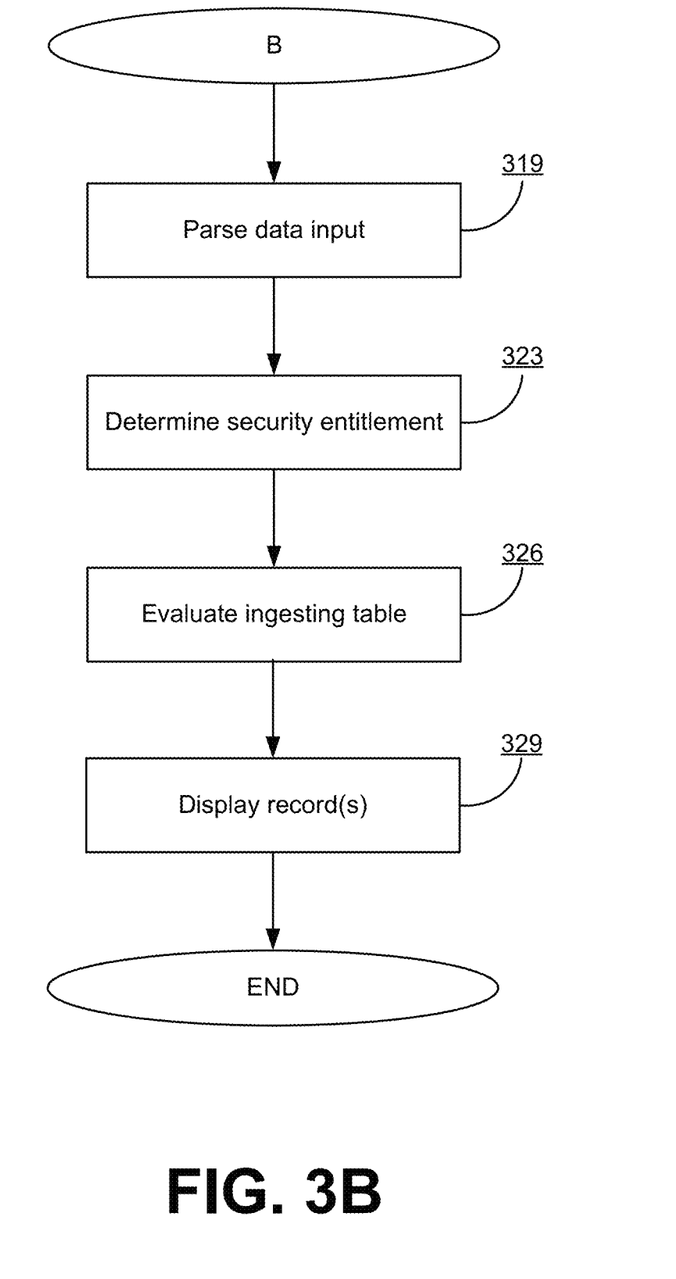
FIG. 3B is a flowchart illustrating one example of functionality implemented as portions of an application executed in a computing environment in the network environment of FIG. 1 according to various embodiments of the present disclosure.

Referring next to FIGS. 3A and 3B, shown is a flowchart that provides one example of the operation of a portion of the AIMSDS application 116. The flowchart of FIGS. 3A and 3B provides merely an example of the many different types of functional arrangements that can be employed to implement the operation of the depicted portion of the AIMSDS application 116. As an alternative, the flowchart of FIGS. 2A and 2B can be viewed as depicting an example of elements of a method implemented within the network environment 103.

Beginning with block 303, the AIMSDS application 116 can request and receive user credentials for authenticating the user. In some examples, the user credentials can be a username and password. In other examples, the user credentials can be a physical security key. The user credentials can be defined by the user via the administrator computing device 106 or the user client device 109. The user can enter the username and password via the user interface 166a of the administrator computing device 106 and/or the user interface 166b of the user client device 109.

At block 306, the AIMSDS application 116 can authenticate the user on the credentials received. In some examples, the authentication can be based at least in part on a predefined user access list. In other examples, the authentication can be based at least in part on the user access level.

At block 309, the AIMSDS application 116 can receive a request from the user to view or display records 153 via the administrator computing device 106 or the user client device 109. In some examples, the user can request to view a plurality of records 153. In other examples, the user can request to download one or more records 153.

At block 313, the AIMSDS application 116 can determine the user access level. In some examples, the user access level can be predefined. In other examples, the user access level can be based at least in part on the user credentials and/or the physical security key.

At block 316, the AIMSDS application 116 can determine the key type used to request to view or display the records. In some examples, the key type can be a data key. In other examples, the key can be a composite key. In some examples, the key type can be determined based at least in part on the requested records. The data key is used to request a single record. The composite key is used to request records from a combination of records.

At block 319, the AIMSDS application 116 can parse the data input. In some examples, the AIMSDS application 116 can parse the data input to determine a data element type. In some examples, the data element type can be the sensitive data elements. In other examples, the sensitive data elements can be determined based at least in part on one or more predefined rules or a user input received via the administrator computing device 106 or the user client device 109. For example, personally identifiable information such as name, address, phone number, social security number, etc. can be sensitive data elements. In some examples, the machine learning model can be used to determine the data is personally identifiable information and be determined to be the sensitive data element.

At block 323, the AIMSDS application 116 can determine the security entitlement. In some examples, the security entitlement of the user can be predefined. In other examples, the security entitlement can be driven by the security policy 156. In other examples, the user can modify the security entitlements via the administrator application of the administrator computing device 106.

At block 326, the AIMSDS application 116 can evaluate the ingesting table for the requested records. In some examples, the requested data can be unavailable. In other examples, the requested records 153 can be encrypted.

At block 329, the AIMSDS application 116 can send the records 153 to be displayed on the display 163a of the administrator computing device 106 by the administrator application 159. In other examples, the AIMSDS application 116 can send the records 153 to be displayed on the display 163b of the user client device 109 by the client application 169. In other examples, the AIMSDS application can generate a user interface or document (e.g., a webpage) that allows the records 153 to be displayed on the user interface 166a of the administrator computing device 106. In some other examples, the AIMSDS application can generate a user interface or document (e.g., a webpage) that allows the records 153 to be displayed on the user interface 166b of the user client device 109. In some other examples, the records 153 sent by the AIMSDS application 116 could be inaccessible based at least in part on the security policy 156 or the security entitlements.

Figure 4A:
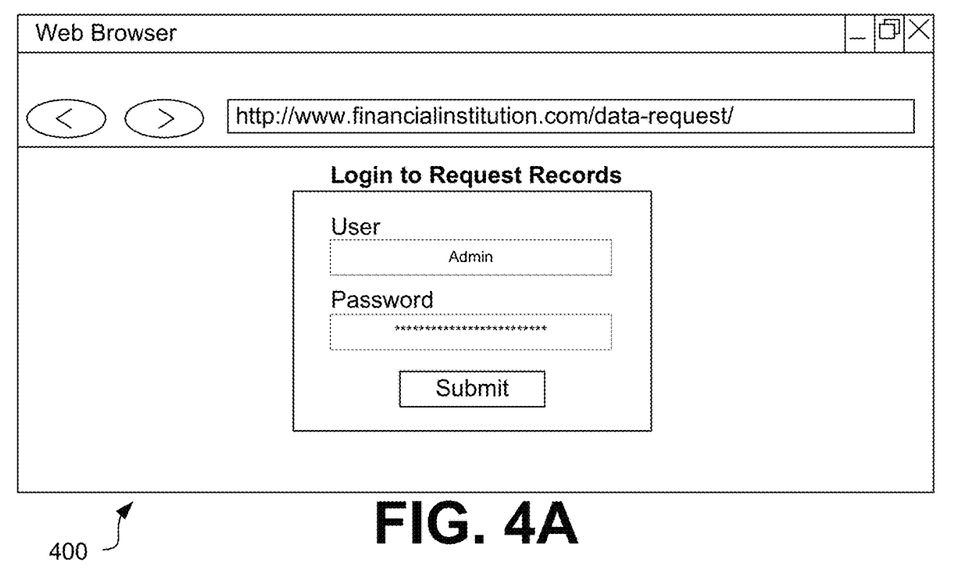
FIG. 4A is a user interface diagram according to various embodiments of the present disclosure.

Referring next to FIG. 4A, shown is a user interface diagram 400 displayed on a display 163a of the administrator computing device 106. In some examples, the user interface 400 can be displayed on a display 163b of the user client device 109. In some examples, the user interface 166a can be rendered on the display 163a by the web browser. In other examples, the user interface 166a can be rendered and displayed on a dedicated application, a mobile application, or other related environments. In some examples, the user interface 166b can be rendered on the display 163b by the web browser. In other examples, the user interface 166b can be rendered and displayed on a dedicated application, a mobile application, or other related environments. The user interface 400 depicts an application to request records 153 of the ingesting table 143. In at least one embodiment, the user interface 400 can be rendered by the administrator application 159. In another embodiment, the user interface 400 can be rendered by the client application 169. In at least one embodiment, the user interface 400 can be rendered by a web browser. The user interface diagram 400 provides affordances for the user to input credentials, (e.g., username and password, physical security key, etc.) to request the records 153. The user interface 166a of the administrator computing device 106 or the user interface 166b of the user client device can be used to input the requested username and password.

Figure 4B:
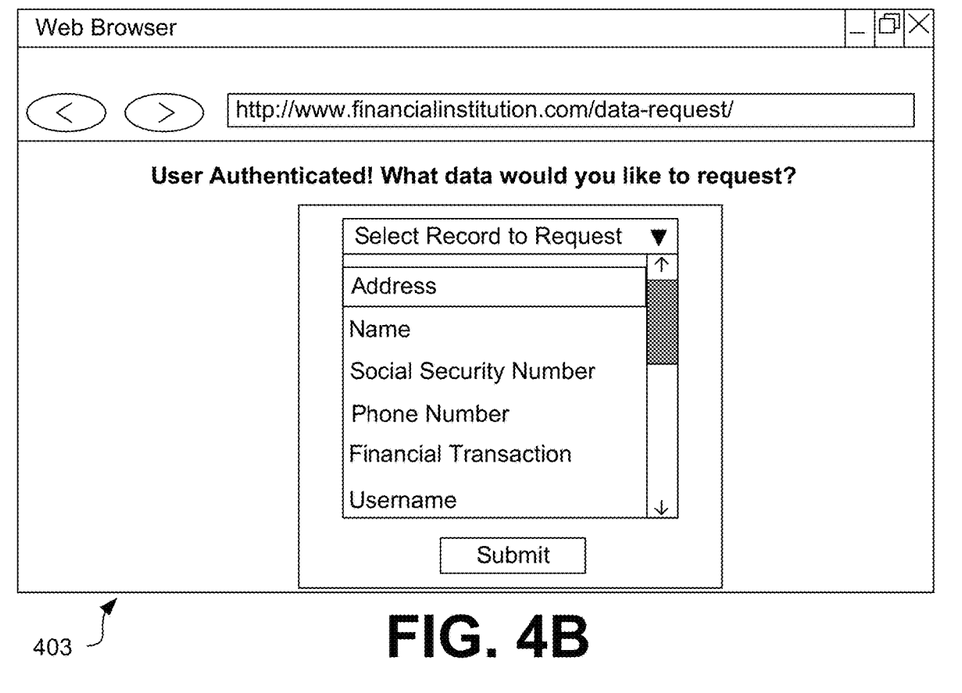
FIG. 4B is a user interface diagram according to various embodiments of the present disclosure.

Referring next to FIG. 4B, shown is a user interface diagram 403 displayed on the display 163a of the administrator computing device 106. In some examples, the user interface 403 can be displayed on the display 163b of the user client device 109. In some examples, the user interface 166a can be rendered on the display 163a by the web browser. In other examples, the user interface 166a can be rendered and displayed on a dedicated application, a mobile application, or other related environments. In some examples, the user interface 166b can be rendered on the display 163b by the web browser. In other examples, the user interface 166b can be rendered and displayed on a dedicated application, a mobile application, or other related environments. The user interface 403 depicts an application to request records 153 of the ingesting table 143. In at least one embodiment, the user interface 403 can be rendered by the administrator application 159. In another embodiment, the user interface 403 can be rendered by the client application 169. In at least one embodiment, the user interface 403 can be rendered by a web browser. In this example, the user provided credentials to be authenticated to request the records 153. The user can select the records to be requested. In some examples, the selection can be a drop-down menu. In other examples, the selection can be a list. The user can select one or more records 153 from the selection menu and click the "submit" button to request the records 153.

Figure 4C:
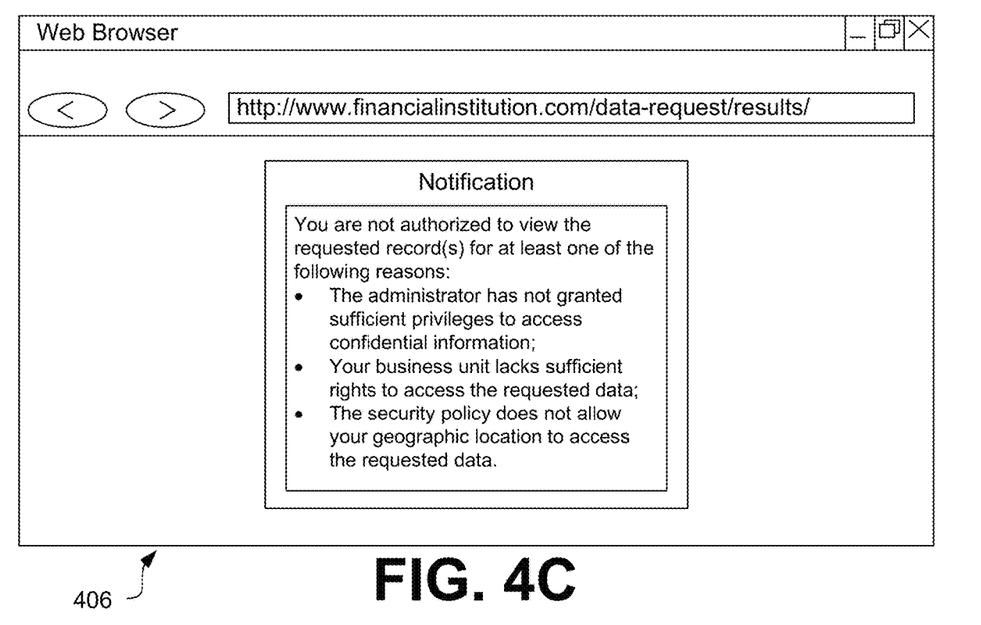
FIG. 4C is a user interface diagram according to various embodiments of the present disclosure.

Referring next to FIG. 4C, shown is a user interface diagram 406 displayed on the display 163a of the administrator computing device 106. In some examples, the user interface 406 can be displayed on the display 163b of the user client device 109. In some examples, the user interface 166a can be rendered on the display 163a by the web browser. In other examples, the user interface 166a can be rendered and displayed on a dedicated application, a mobile application, or other related environments. In some examples, the user interface 166b can be rendered on the display 163b by the web browser. In other examples, the user interface 166b can be rendered and displayed on a dedicated application, a mobile application, or other related environments. The user interface 406 depicts an application to request records 153 of the ingesting table 143. In at least one embodiment, the user interface 406 can be rendered by the administrator application 159. In another embodiment, the user interface 406 can be rendered by the client application 169. In another embodiment, the user interface 406 can be rendered by a web browser. In this example, the user is presented a notification on the user interface 406. The notification is based at least in part on the user's credentials lacking permission(s) to view the records 153 selected in FIG. 4B. In some examples, the notification could be displayed based at least in part on enforcement of the security policy 156.

Figure 4D:
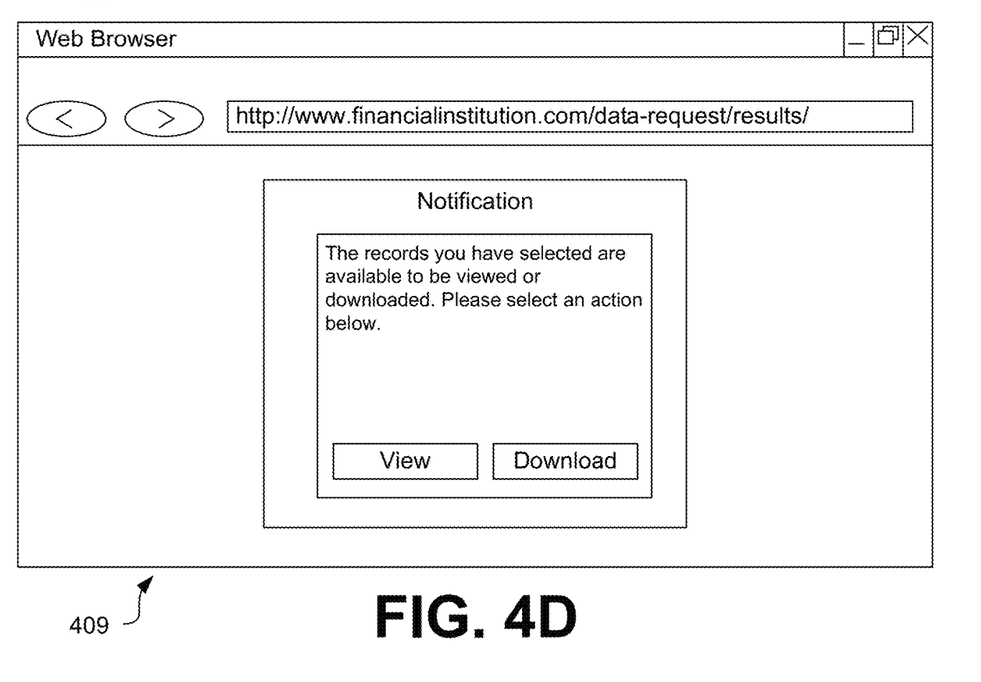
FIG. 4D is a user interface diagram according to various embodiments of the present disclosure.

Referring next to FIG. 4D, shown is a user interface diagram 409 displayed on the display 163a of the administrator computing device 106. In some examples, the user interface 409 can be displayed on the display 163b of the user client device 109. In some examples, the user interface 166a can be rendered on the display 163a by the web browser. In other examples, the user interface 166a can be rendered and displayed on a dedicated application, a mobile application, or other related environments. In some examples, the user interface 166b can be rendered on the display 163b by the web browser. In other examples, the user interface 166b can be rendered and displayed on a dedicated application, a mobile application, or other related environments. The user interface 406 depicts an application to request records 153 of the ingesting table 143. In at least one embodiment, the user interface 409 can be rendered by the administrator application 159. In another embodiment, the user interface 409 can be rendered by the client application 169. In another embodiment, the user interface 409 can be rendered by a web browser. In this example, the user is presented a notification on the user interface 409. The notification is based at least in part on the user's credentials granting permissions to access the records 153 selected in FIG. 4B. In some examples, the user interface 409 can allow the user to view and/or download the records 153 selected in FIG. 4B by clicking on "view" and/or "download" button, respectively.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same management computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
   store a data input from at least one data source in at least one ingesting table;
   determine one or more data elements of the data input;
   parse the data input to determine at least one sensitive data element;
   determine a confidentiality level of the at least one sensitive data element of the data input in the at least one ingesting table based at least in part on the at least one sensitive data element;
   determine a drive mapping data set based at least in part on at least one decision rule for mapping one or more data elements;
   join the at least one ingesting table with the drive mapping data set;
   apply at least one security policy to a type of data in the data input based at least in part on the drive mapping data set or the confidentiality level;
   authenticate a user to request at least one record;
   determine a user access level for requesting the at least one record;
   determine at least one security entitlement by joining the at least one ingesting table and a drive mapping data set;
   evaluate the at least one ingesting table for the at least one record; and
   display the at least one record.

2. The system of claim 1, wherein the machine-readable instructions, when executed by the processor, further cause the computing device to update the drive mapping data set based at least in part on a set of dynamic global regulations.

3. The system of claim 1, wherein the machine-readable instructions, when executed by the processor, further cause the computing device to output a data tag for the one or more data elements based at least in part on the at least one decision rule.

4. The system of claim 1, wherein the machine-readable instructions, when executed by the processor, further cause the computing device to encrypt the at least one sensitive data element before storing it in the at least one ingesting table.

5. The system of claim 1, wherein the at least one security policy enforces encryption of the data input based at least in part on the type of data.

6. A method, comprising:
storing a data input from at least one data source in at least one ingesting table;
determining one or more data elements of the data input;
parsing the data input to determine at least one sensitive data element;
determining a confidentiality level of the at least one sensitive data element of the data input in the at least one ingesting table based at least in part on the at least one sensitive data element;
determine a drive mapping data set based at least in part on at least one decision rule for mapping one or more data elements;
joining the at least one ingesting table with a drive mapping data set;
applying at least one security policy to a type of data in the data input based at least in part on the drive mapping data set or the confidentiality level;
authenticating a user to request at least one record; and
determining a user access level for requesting the at least one record,
determining at least one security entitlement by joining the at least one ingesting table and a drive mapping data set;
evaluating the at least one ingesting table for the at least one record; and
displaying the at least one record.

7. The method of claim 6, further comprising updating the drive mapping data set based on a set of dynamic global regulations.

8. The method of claim 6, further comprising outputting a data tag for the one or more data elements based at least in part on the at least one decision rule.

9. The method of claim 6, further comprising encrypting the at least one sensitive data element before storing it in the at least one ingesting table.

10. The method of claim 6, wherein the at least one security policy enforces an encryption of the data input based at least in part of the type of data.

11. A non-transitory, computer-readable medium, comprising machine-readable instructions that, when executed by a processor of a computing device, cause the computing device to at least:
store a data input from at least one data source in at least one ingesting table;
determine one or more data elements of the data input;
parse the data input to determine at least one sensitive data element;
determine a confidentiality level of the at least one sensitive data element of the data input in the at least one ingesting table based at least in part on the at least one sensitive data element;
determine a drive mapping data set based at least in part on at least one decision rule for mapping one or more data elements;
join the at least one ingesting table with a drive mapping data set;
apply at least one security policy to a type of data in the data input based at least in part on the drive mapping data set or the confidentiality level;
authenticate a user to request at least one record;
determine a user access level for requesting the at least one record;
determine at least one security entitlement by joining the at least one ingesting table and a drive mapping data set;
evaluate the at least one ingesting table for the at least one record; and
display the at least one record.

12. The non-transitory, computer-readable medium of claim 11, wherein the machine-readable instructions, when executed by the processor, further cause the computing device to update the drive mapping data set based at least in part on a set of dynamic global regulations.

13. The non-transitory, computer-readable medium of claim 11, wherein the machine-readable instructions, when executed by the processor, further cause the computing device to output a data tag for the one or more data elements based at least in part on the at least one decision rule.

14. The non-transitory, computer-readable medium of claim 11, wherein the at least one security policy enforces an encryption of the data input based at least in part on the type of data.

* * * * *